US011173920B2

(12) United States Patent
Zhang et al.

(10) Patent No.: US 11,173,920 B2
(45) Date of Patent: *Nov. 16, 2021

(54) SYSTEM AND METHOD FOR PREDICTING AND INTERPRETING DRIVING BEHAVIOR

(71) Applicant: DENSO International America, Inc., Southfield, MI (US)

(72) Inventors: Wei Zhang, Novi, MI (US); Joseph Lull, South Haven, MI (US); Rajesh Kumar Malhan, Troy, MI (US)

(73) Assignee: DENSO International America, Inc., Southfield, MI (US)

( * ) Notice: Subject to any disclaimer, the term of this patent is extended or adjusted under 35 U.S.C. 154(b) by 16 days.

This patent is subject to a terminal disclaimer.

(21) Appl. No.: 16/836,129

(22) Filed: Mar. 31, 2020

(65) Prior Publication Data
US 2021/0122378 A1 Apr. 29, 2021

Related U.S. Application Data

(60) Provisional application No. 62/926,873, filed on Oct. 28, 2019.

(51) Int. Cl.
*B60W 40/09* (2012.01)
*G06N 3/08* (2006.01)
(Continued)

(52) U.S. Cl.
CPC ......... *B60W 40/09* (2013.01); *G06F 9/30036* (2013.01); *G06K 9/6221* (2013.01);
(Continued)

(58) Field of Classification Search
CPC .. B60W 30/0956; B60W 40/06; B60W 40/09; B60W 2540/30; G05B 13/048;
(Continued)

(56) References Cited

U.S. PATENT DOCUMENTS 6,917,284 B2 7/2005 Grisham et al.
7,444,241 B2 10/2008 Grimm
(Continued)

FOREIGN PATENT DOCUMENTS

| CN | 102201165 A | 9/2011 |
|---|---|---|
| CN | 106355887 A | 1/2017 |
| JP | 2004220423 A | 8/2004 |

*Primary Examiner* — Stephen R Burgdorf
(74) *Attorney, Agent, or Firm* — Harness, Dickey & Pierce, P.L.C.

(57) ABSTRACT

A system for predicting and interpreting driving behavior of a vehicle includes a first edge computing device that can acquire spatial-temporal data for the vehicle from one or more sensors that are part of traffic infrastructure. The first edge computing device includes a processor and instructions executable by the processor that execute unsupervised deep learning methods on the data from the sensors to cluster the data into segments and integrate a language model with the deep learning method to output driving behavior in a natural language. The instructions further include normalizing the data, processing the data with a first artificial neural network (ANN) to output a first vector, processing the clustered data segments with a second ANN to output a second vector, concatenating the vectors into a single vector, and processing the single vector with a third ANN to output a predicted driving behavior of the vehicle.

20 Claims, 6 Drawing Sheets

(51) Int. Cl.
  *G06N 3/04* (2006.01)
  *G06K 9/62* (2006.01)
  *G06F 9/30* (2018.01)
  *G06N 5/04* (2006.01)

(52) U.S. Cl.
  CPC ........... *G06N 3/0454* (2013.01); *G06N 3/088* (2013.01); *G06N 5/045* (2013.01); *B60W 2540/30* (2013.01)

(58) Field of Classification Search
  CPC .. G06F 9/30036; G06K 9/00; G06K 9/00805; G06K 9/00838; G06K 9/00845; G06K 9/6221; G06K 99/005; G06N 3/0454; G06N 3/08; G06N 3/088; G06N 5/045
  USPC ......................................................... 340/439
  See application file for complete search history.

(56) References Cited

U.S. PATENT DOCUMENTS

| | | |
|---|---|---|
| 7,797,108 B2 | 9/2010 | Grimm |
| 9,558,666 B2 | 1/2017 | Jansson et al. |
| 10,235,882 B1 | 3/2019 | Aoude et al. |
| 2012/0131674 A1* | 5/2012 | Wittenschlaeger ........................ H04L 63/1425 726/23 |
| 2017/0053461 A1* | 2/2017 | Pal ........... H04W 4/027 |
| 2018/0336424 A1* | 11/2018 | Jang ........... G06T 7/20 |
| 2019/0050729 A1* | 2/2019 | Lakshmanan ............ G08G 1/00 |
| 2019/0333156 A1 | 10/2019 | Malkes et al. |
| 2020/0142421 A1* | 5/2020 | Palanisamy ........ G06K 9/00791 |
| 2020/0287923 A1* | 9/2020 | Raghavendra ......... G06N 5/022 |
| 2021/0012100 A1* | 1/2021 | Hoffmann .............. G06K 9/622 |
| 2021/0097408 A1* | 4/2021 | Sicconi .................... G06K 9/48 |

* cited by examiner

SYSTEM AND METHOD FOR PREDICTING AND INTERPRETING DRIVING BEHAVIOR

CROSS-REFERENCE TO RELATED APPLICATIONS

This application claims the benefit of U.S. Provisional Application No. 62/926,873 filed Oct. 28, 2019. The entire disclosures of the applications referenced above are incorporated by reference.

FIELD

The present disclosure relates to systems and methods for predicting and interpreting the driving behavior of road vehicles such as cars and trucks.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Conventional systems and methods for predicting driving behavior may use supervised deep learning neural networks (i.e., supervised deep learning based on artificial neural networks) to predict the driving behavior of road vehicles such as cars and trucks. While such conventional systems and methods may be used to predict the driving behavior of cars and trucks, such conventional systems and methods may be limited in function. Accordingly, conventional systems and methods for predicting driving behavior are subject to improvement.

SUMMARY

In one example, a system for predicting and interpreting driving behavior of a vehicle is provided that may include a first edge computing device configured to acquire spatial-temporal data for the vehicle from one or more sensors that are part of traffic infrastructure. The first edge computing device may be arranged as a stationary component of traffic infrastructure. The first edge computing device may have a processor and a non-transitory computer-readable medium that may include instructions that are executable by the processor. The instructions may include executing one or more unsupervised deep learning methods on the spatial-temporal data acquired by the one or more sensors to cluster the spatial-temporal data into segments and integrating a language model with the unsupervised deep learning method to output a driving behavior in natural language. The instructions may further include normalizing the spatial-temporal data of the vehicle, processing the normalized spatial-temporal data of the vehicle with a first artificial neural network to output a spatial-temporal data vector, processing the clustered spatial-temporal data segments using a second artificial neural network to output a behavior feature vector, concatenating the spatial-temporal data vector and the behavior feature vector into a concatenated vector, and processing the concatenated vector with a third artificial neural network to output a predicted driving behavior of the vehicle.

In another example, a system for predicting and interpreting driving behavior of a vehicle is provided that may include an edge computing device configured to acquire vehicle data from one or more sensors on the vehicle. The edge computing device may be disposed in the vehicle. The edge computing device may have a processor and a non-transitory computer-readable medium that may include instructions that are executable by the processor. The instructions may include executing one or more unsupervised deep learning methods on the vehicle data to cluster the vehicle data into segments and integrating a language model with the unsupervised deep learning method to output a driving behavior in natural language. The instructions may further include acquiring spatial-temporal data of the vehicle from one or more external remote sensors, normalizing the spatial-temporal data of the vehicle, processing the normalized spatial-temporal data of the vehicle with a first artificial neural network to output a spatial-temporal data vector, processing the clustered vehicle data segments using a second artificial neural network to output a behavior feature vector, concatenating the spatial-temporal data vector and the behavior feature vector into a concatenated vector, and processing the concatenated vector with a third artificial neural network to output a predicted driving behavior of the vehicle.

In even another example, a method for interpreting and predicting driving behavior of a vehicle is provided. The method may include clustering vehicle data using an unsupervised deep learning method into segments and integrating a natural language model with the unsupervised deep learning method to output explanations of the segments in natural language. The method may further include normalizing spatial-temporal data of the vehicle acquired by a remote external sensor, processing the normalized spatial-temporal data with a first artificial neural network to output a surrounding features vector, processing the segments with a second artificial neural network to output a behavior feature vector, concatenating the surrounding features vector and the behavior feature vector into a concatenated vector, and processing the concatenated vector with a third artificial neural network to obtain a prediction of driving behavior.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

In conventional systems and methods for predicting driving behavior, such conventional systems and methods use deep learning trained by large amounts of labeled data to calculate prediction results. However, the deep learning neural networks used by such conventional systems and methods may have problems. For example, if such conventional systems and methods use driving behavior interpretation algorithms to provide a better understanding of driving behavior, such algorithms may lead to poor driving behavior prediction results. The prediction times of conventional deep learning prediction systems may also be limited. That is, while conventional deep learning prediction systems may be able to make accurate predictions for road vehicles one to two seconds in advance (i.e., one to two seconds into the future), the accuracy of the driving behavior predictions for vehicles greatly diminishes for predictions more than two seconds into the future.

Example embodiments are described with reference to the accompanying drawings.

Figure 1:
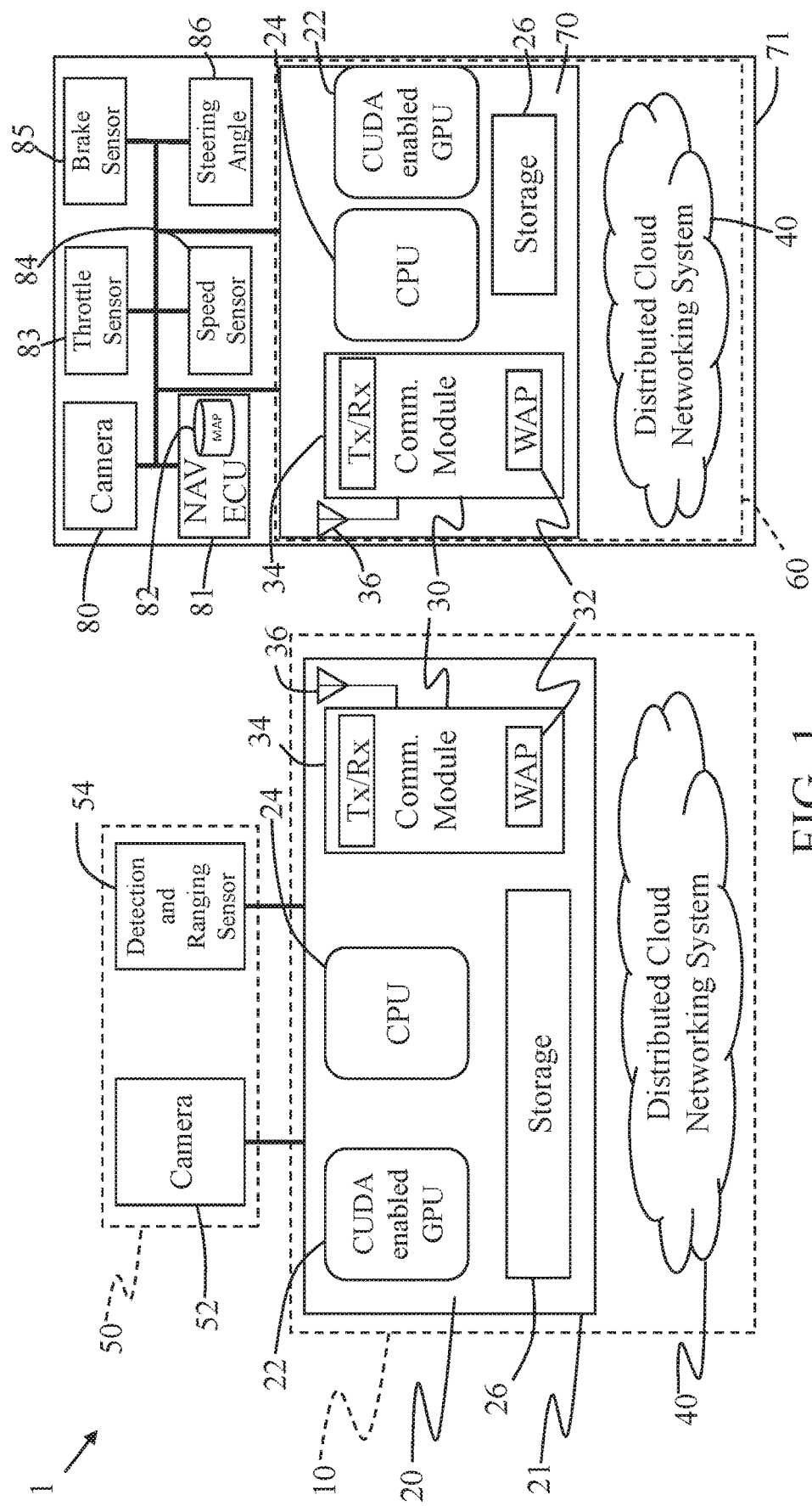
FIG. 1 is a schematic diagram of road side infrastructure and vehicle infrastructure in a system for predicting and interpreting driving behavior.

With reference to FIG. 1, a block schematic of a system 1 for predicting and interpreting driving behavior is shown. The driving behavior and interpretation system 1 includes a first edge computing device 10 and a second edge computing device 60. Both the first edge computing device 10 and the second edge computing device 60 may have similar components. Accordingly, like components may use the same reference numbers and repeat descriptions of like components may be omitted.

Figure 2:
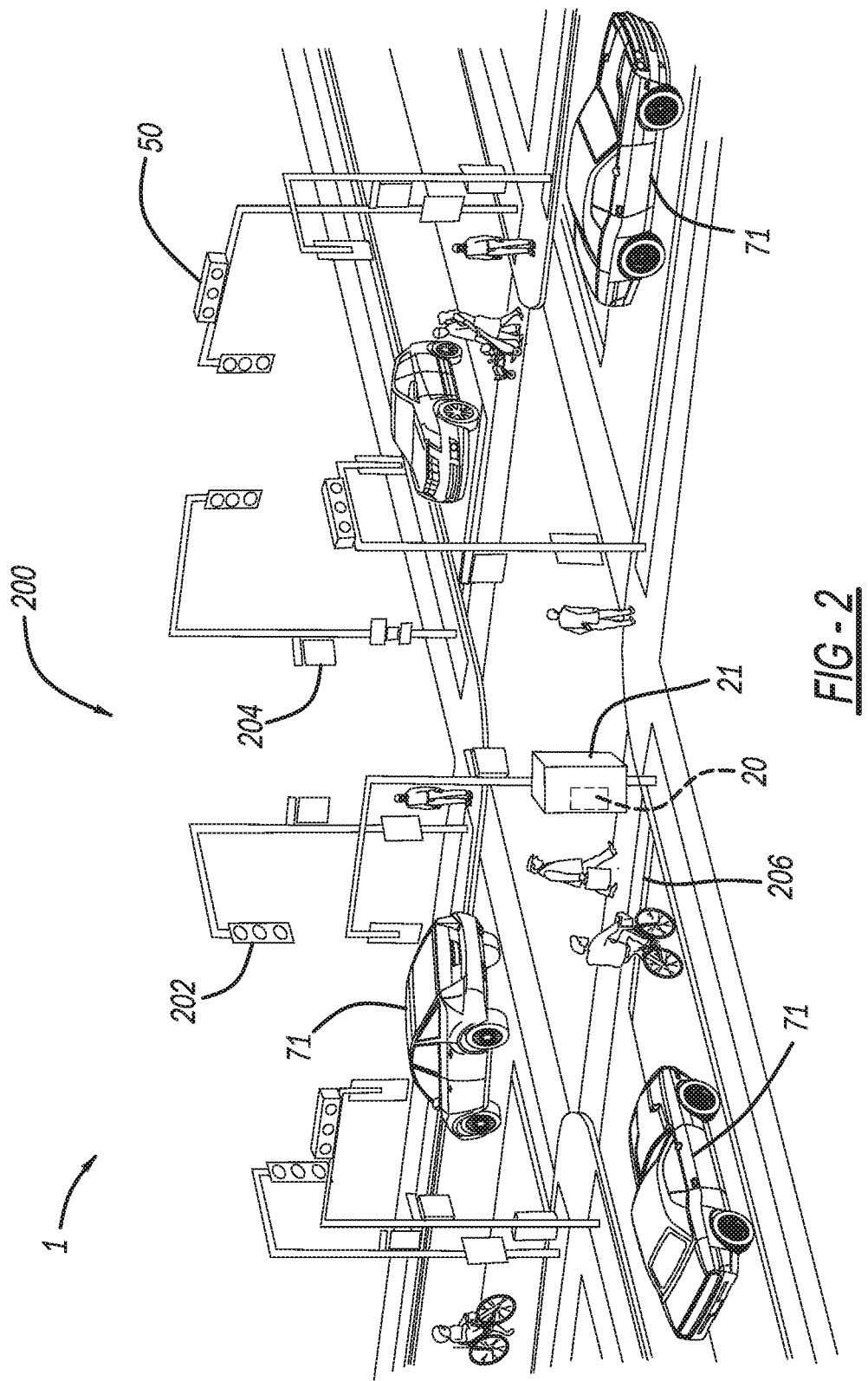
FIG. 2 illustrates an example operating environment for the system for predicting and interpreting driving behavior.

Portions of the first edge computing device 10 may be configured as a roadside unit (RSU) 20 that is integrated into existing roadside infrastructure. For example, with reference to FIG. 2, the RSU 20 may be integrated into the existing infrastructure at an intersection 200 and housed in a traffic cabinet 21. As such, the first edge computing device 10 is intended to be a stationary component of the traffic or intersection infrastructure. In other words, the RSU 20 portion of the first edge computing device may be arranged as a stationary component of the traffic infrastructure.

With reference again to FIG. 1, the first edge computing device 10 and the RSU 20 may be referred to as the "infrastructure side" to differentiate the first edge computing device 10 from the second edge computing device 60.

Parts of the second edge computing device 60 may be an on-board unit (OBU) 70 that is integrated together with the various electronic and computer systems and subsystems in a vehicle 71. For example, the OBU 70 may be configured to communicate with other electronic control units (ECUs) in the vehicle using a Controller Area Network (CAN) bus communication standard. The second edge computing device 60 and the OBU 70 may be referred to as the "vehicle side" to differentiate the second edge computing device 60 and the OBU 70 from the infrastructure side.

In addition to the first edge computing device 10, other components on the infrastructure side may include one or more sensor arrays 50 with one or more cameras 52 and detection and ranging sensors 54 connected to the first edge computing device 10. In an example embodiment, the one or more sensor arrays 50 may be an optional component While the first edge computing device 10 and the second edge computing device 60 of the driving behavior prediction and interpretation system 1 are described in the singular, the driving behavior prediction and interpretation system 1 is not limited to having one first edge computing device 10 and one second edge computing device 60. For example, each intersection having traffic infrastructure such as traffic control signals may include an RSU 20. In other example, a plurality of RSUs 20 may be disposed along the side of the road and spaced apart from each other based on the sensing range of their sensor arrays 50. In even another example, a plurality of vehicles 71 may be equipped with OBUs 70. Similarly, the driving behavior prediction and interpretation system 1 may include a singular edge computing device, for example, either the first edge computing device 10 or the second edge computing device 60. In instances where the driving behavior prediction and interpretation system 1 includes the second edge computing device 60 as a singular computing device, the second edge computing device may be referred to generally, for example, as the edge computing device 60. The first edge computing device 10 may likewise be referred to in the singular, for example, as the edge computing device 10.

As compared to conventional computing systems used in conventional driving behavior prediction systems, the first and second edge computing devices 10 and 60 have enhanced processing capabilities, lower latency, and faster response times.

For example, with respect to the first edge computing device 10, based on the enhanced computing capabilities, the first edge computing device 10 can better cluster the data acquired from the sensor array 50 into segments using artificial intelligence (AI) algorithms. The segments can then be used to generate symbolic representations and natural language interpretations to better interpret driving behavior, in addition to processing the data acquired from the sensor array 50 to predict driving behavior of vehicles 71 within the sensing range of the sensor array 50. By using the AI algorithms, the first edge computing device 10 of the driving behavior prediction and interpretation system 1 can increase the confidence level of the calculated predictions.

The first edge computing device 10 is configured as a distributed computing system that includes the RSU 20 that networks and communicates with a distributed cloud networking system 40 (i.e., "the cloud"). The RSU 20 includes a graphics processing unit (GPU) 22, a central processing unit (CPU) 24, storage 26, and a communications module 30. The RSU 20 may be housed inside a traffic cabinet 21 at an intersection. The traffic cabinet 21 may include other hardware in addition to the RSU 20 for controlling the traffic signals at an intersection. The RSU 20 of the first edge computing device 10 and the sensor array 50 may be powered directly and/or indirectly from the grid power/utility power used for powering the other electric components at the intersection such as the control signals, pedestrian signals, street lights, electric signage, traffic control signal hardware, and the like. That is, the RSU 20 portion of the driving prediction and interpretation system may be powered by the electric infrastructure already in place at the intersection. While the RSU 20 of the first edge computing device 10 may be part of a vehicle-to-infrastructure (V2I) system, the RSU 20 of the present disclosure differs from conventional RSUs, in that the RSU 20 includes enhanced computational abilities for executing parallel computations using AI algorithms.

The GPU 22 is a processor that includes various interfaces such as a bus interface and a display interface, a video processing unit (VPU), a graphics memory controller (GMC), a compression unit, and a graphics and computer array (GCA), among other components (all not shown). The GPU 22 supports massive threading and parallel computing and is a CUDA-enabled GPU. CUDA is an abbreviation for Compute Unified Device Architecture and is a registered trademark of the Nvidia Corporation. CUDA is a parallel computing platform and application programming interface that allows the GPU 22 to be used for general purpose parallel processing. While CUDA is used as an example to support parallel computing, the GPU 22 may use an alternative platform and application programming interface (API) for parallel processing.

By using the GPU 22, large blocks of data can be used in calculations with AI algorithms more effectively and efficiently than the same calculations using the CPU 24. Such AI algorithms may include, for example, dynamic time warping (DTW), hidden Markov models (HMM), and the Viterbi algorithm. In other words, using the GPU 22 allows the first edge computing device 10 to more quickly execute parallel calculations using AI algorithms to analyze and process measurements from the sensor array 50 into segmentations and to predict driving behavior for vehicles 71 based on sensor data from the sensor array 50. The GPU 22 may be used with AI algorithms to process and analyze measurement data from the sensor array 50, as well as other data, to determine spatial-temporal data of the vehicles 71, cluster the spatial-temporal data into segmentations, and predict, for example, the paths, trajectories, intent, and behaviors for the vehicles 71 (i.e., predicting the driving behavior of the vehicles 71), in addition to interpreting the driving behavior. The predictions and interpretations determined by the GPU 22 for each of the vehicles 71 may be stored in the storage 26. The predictions and interpretations by the GPU 22 may be sent to the distributed cloud networking system 40 via the communication module 30 for further processing, such as modeling, simulation, and prediction training.

The CPU 24 may be a processor for executing less computational intensive programs and instruction sets than the GPU 22. The CPU 24 may also be configured as a microcontroller or as a System on Chip (SoC). For example, the CPU 24 may execute programs and instruction sets for transferring data between the storage 26, the GPU 22, and the communication module 30. The CPU 24 may also be used for controlling the communication module 30 to transfer and receive data from the distributed cloud networking system 40.

The CPU 24 may also be used as an input/output for receiving and transmitting data to/from the sensor array 50. Alternatively, the communication module 30 may be used for communications between the RSU 20 and the sensor array 50.

The storage 26 may be a memory such as random-access memory (RAM), read-only memory (ROM) and flash memory, and/or a storage device such as a magnetic hard drive (HDD) or a solid-state drive (SSD) using flash memory. The storage 26 may be used to store driving behavior predictions and interpretations for the vehicles, in addition to pre-trained models used by the AI algorithms executed by the GPU 22. The storage 26 may also store driving behavior prediction and interpretation data from the GPU 22 for further processing by the distributed cloud networking system 40 to generate trained prediction models and run simulations. The storage 26 may also store programs, instruction sets, and software used by the GPU 22 and the CPU 24. The storage 26 storing programs, instruction sets, and software that can be executed by the processors, such as the GPU 22 and the CPU 24, is an example of the storage 26 being a non-transitory computer-readable medium. The storage 26 may also be referred to generally as a non-transitory computer-readable medium.

The communication module 30 allows the RSU 20 of the first edge computing device 10 to transmit and receive signals and data with external systems, devices, and networks. Generally, the communication module 30 may be used to input and output signals and data to and from the RSU 20. The communication module 30 may be used to receive messages from other connected infrastructure such as signal phase and timing (SPaT) messages from traffic and pedestrian control signals, basic safety messages (BSMs) from vehicles having dedicated short-range communication (DSRC) and connected to a vehicle-to-everything (V2X) system, and personal safety messages (PSMs) from pedestrians and cyclists connected to the V2X system (e.g., by a mobile phone). The communication module 30 may also be used to broadcast SPaT messages and intersection Map Data (MAP) messages to connected road users.

The communication module 30 may include a wireless access point (WAP) 32, gateway, or like networking hardware to wirelessly connect the RSU 20 to an external network such as a wireless local area network (WLAN) or local area network (LAN). For example, the WAP 32 may be configured to communicate wirelessly using an IEEE 802.11 protocol. Alternatively, or in addition to the WAP 32, the communication module 30 may include a transmitting and receiving device 34 that is configured to communicate either wirelessly or by wire with external devices. The transmitting and receiving device 34 may be, for example, a transceiver, a modem, and a network switch. For example, the transmitting and receiving device 34 may be a cellular transceiver 34 configured to transmit and receive cellular signals at cellular allocated frequencies. As such, the cellular transceiver 34 may be configured for mobile telecommunication and cellular network technologies such as 2G, 3G, 4G LTE, and 5G for transmitting and receiving data to provide mobile broadband capabilities to the RSU 20. A cellular transceiver 34 can connect the RSU 20 to a wireless wide area network (WWAN) or WAN. Generally, the communication module 30 may be configured for wired and wireless communications using common communication standards and technology such as IEEE 802.3, IEEE 802.11, Bluetooth, mobile broadband, and the like.

The communication module 30 may be connected by wired connection or wirelessly with the sensors of the sensor array 50. The communication module 30 may also include one or more antennas 36 for transmitting radio signals from the communication module 30 and receiving radio signals at the communication module 30. Alternatively, both the WAP 32 and the transmitting and receiving device 34 may respectively include one or more individual antennas.

The distributed cloud networking system 40 (i.e., "the cloud") is one or more cloud computing elements that is part of the first edge computing device 10. The distributed cloud networking system 40 provides additional resources like data storage and processing power to the first edge computing device 10. Because the distributed cloud networking system 40 is accessible over the Internet, the distributed cloud networking system 40 is configured to communicate with the RSU 20 of the first edge computing device 10 via the communication module 30.

The distributed cloud networking system 40 may include any number or different services such as infrastructure as a service (IaaS), platform as a service (PaaS), software as a service (SaaS), backend as a service (BaaS), serverless computing, and function as a service (FaaS). The distributed cloud networking system 40 may be a commercial cloud computing service such as Amazon Web Services (AWS), Microsoft Azure, Google Cloud Platform (GCP), or Oracle Cloud, all registered trademarks.

In addition to the AI algorithms used by the GPU 22 to calculate driving behavior predictions and driving behavior interpretations for vehicles, the distributed cloud networking system 40 may be used to calculate trained prediction models and run simulations that can be used by the GPU 22 and applied to the AI algorithms to better predict and interpret driving behavior. Trained prediction models calculated by the distributed cloud networking system 40 may be stored in the storage 26 of the RSU 20 for use by the GPU 22.

While the description may describe specific components of the first edge computing device 10 performing a function or process, the first edge computing device 10 generally performs the same function or process described as being performed by the subsystem or sub-component of the first edge computing device 10. That is, higher level components can also be described as performing the same functions as their subsystems and sub-components. For example, while the GPU 22 is described as performing calculations using AI algorithms, both the first edge computing device 10 and the RSU 20 can also be described as performing calculations using AI algorithms.

The processes and functions performed by both the first edge computing device 10 and the second edge computing device 60 may be based on the execution of a program or instruction set (i.e., "instructions") stored on a non-transitory computer read-able medium (e.g., RAM, ROM, flash memory as storage 26) by a processor (e.g., GPU 22, CPU 24). The execution of the instructions by the processor cause the processor, or more generally the first edge computing device 10 and the RSU 20, or the second edge computing device 60 and the OBU 70, to perform the instructions as processes/functions, for example, to perform the example processes shown in FIGS. 3 and 5.

The sensor array 50 includes sensors that are used to acquire spatial-temporal data from vehicles around the intersection. The sensor data from the sensor array 50 can be used by the GPU 22 to predict (i.e., calculate predictions) the driving behavior of the vehicles 71 around the intersection 200. Relative to the vehicles 71, the sensor array 50 is both external to the vehicles 71 (i.e., outside of the vehicles 71) and remote from the vehicles (i.e., disposed at a distance away from the vehicles 71). The sensor array 50 is also a stationary component that is part of the traffic/intersection infrastructure.

With reference again to FIG. 2, the driving behavior prediction and interpretation system 1 may include one or more sensor arrays 50 at different locations around the intersection 200 to obtain a 360 degree)(° view and sensing area of the intersection 200. The one or more sensor arrays 50 at the intersection 200 may provide a viewing and sensing area, for example, with a two hundred meter radius centered at the intersection. That is, the camera 52 and detection and ranging sensors 54 in the sensor array 50 have a range of about two hundred meters from the intersection.

With reference again to FIG. 1, each sensor array 50 may include one or more cameras 52 and one more detection and ranging sensors 54. While the camera 52 and the detection and ranging sensor 54 are described as being part of a sensor array 50, the camera 52 and the detection and ranging sensor 54 are not necessarily limited to this configuration and may be disposed separately and in different locations around the intersection 200. Alternatively, instead of the sensor array 50 having a combination of cameras 52 and detection and ranging sensors 54, the sensor array 50 may be limited to either (i) an array of one or more cameras 52 oriented at different angles and different directions, or (ii) an array of one or more detection and ranging sensors 54 oriented at different angles and different directions. In this alternative configuration, camera array 50 and ranging sensor array 50 are used to distinguish between sensors arrays having only one type of sensor.

The camera 52 may be a normal optical device relying on natural light to capture images. The camera 52 may be configured to capture individual images or a video stream. For example, the camera 52 may be configured to capture sequential images or real-time video of vehicles 71 at a predefined interval or frame rate with the captured images/video being used by the GPU 22 to determine spatial-temporal data for each vehicle 71.

Images and videos captured by the camera 52 may be further processed by the GPU 22 with machine vision algorithms to identify and track all vehicles 71 within the viewing range of the camera 52 (e.g., 200 meters).

The camera 52 may include additional enhancements to reduce the camera's reliance on natural light. For example, the camera 52 may include artificial lights and flashes to provide better image capturing capabilities. The camera may also include advanced sensors such as a complementary metal-oxide-semiconductor field-effect transistor (CMOS) sensor for better capturing images in poor or low lighting conditions. Such sensors may be combined with artificial light such as infrared lighting for low light imaging and night vision capabilities. Alternatively, the camera 52 may be a thermographic camera such as an infrared camera or a thermal imaging camera for capturing images of the vehicles by using the heat signatures of the vehicles.

While the RSU 20 may use machine vision algorithms on the image data captured by the camera 52 to identify and track the vehicles 71 around the intersection 200, sequential still images and video streams of vehicles 71 captured by the camera 52 may be processed by the GPU 22 to generate spatial-temporal data for all road users around an intersection. Spatial-temporal data acquired by the camera 52 may include the trajectory, path, direction, bearing, and azimuth for all the tracked vehicles 71. For example, image data captured by the camera 52 may be used to identify the trajectories of the vehicles 71 and the changes in the trajectories of the vehicles 71. The GPU 22 may also use image and video data from the camera 52 to calculate speed and acceleration of the vehicles 71, but this data may be better acquired by the detection and ranging sensor 54. The spatial-temporal data can be further processed by the GPU 22 with AI algorithms to predict the driving behaviors of the vehicles around the intersection 200.

In addition to tracking the movement of the vehicles 71 to generate spatial-temporal data of the vehicles 71, the camera 52 may be used to capture other data around the intersection 200. For example, the camera 52 may be used to monitor the road condition and detect objects in the road such as pedestrians, cyclists, animals, potholes, roadkill, lost loads, refuse, and the like, all of which may cause vehicles 71 to swerve or brake to avoid the object. That is, the camera 52 may correlate the detected object to the trajectories, speeds, and accelerations of the vehicles to calculate driving behavior patterns for the vehicles 71. For example, if vehicles 71 in the road are swerving to avoid a pothole, the GPU 22 may correlate the pothole to changes in the trajectories of the vehicles 71 when determining the predicted trajectories of the vehicles 71. Such data can be used by the GPU 22 and applied to the AI algorithms to better predict the driving behavior of the vehicles 71 in view of such objects.

Likewise, the camera 52 may be used to monitor weather conditions to determine if the weather may affect the driving behavior of the vehicles 71. For example, rain and snow may affect the road surface causing a more slippery road surface and requiring extra time for vehicles 71 to slow to a stop or necessitating extra care in driving on such weather-affected road surfaces. Such information can be used by the GPU 22 to detect changes in the trajectories, speeds, and accelerations of the vehicles 71 to predict driving behaviors. The GPU 22 may correlate such weather conditions to the trajectory, speed, and acceleration data acquired by the sensor array 50 and factor these conditions into the driving predictions by the GPU 22. That is, the weather data acquired by the camera 52 can be used by the GPU 22 and applied to the AI algorithms to better predict the driving behaviors of the vehicles 71 in view of such weather conditions.

The sensor array 50 may also include one or more detection and ranging sensors 54. The detection and ranging sensor 54 may be configured to output a radio wave, receive the reflected radio wave, and measure a time from outputting the radio wave to receiving the reflected radio wave. The time measurement from the sensor 54 can be used as a basis for detecting a vehicle 71 and calculating the speed and acceleration of the vehicle 71. For example, the detection and ranging sensor 54 may output a radio wave toward the vehicle 71 and receive the radio wave reflected from the vehicle 71 to detect and measure the speed and acceleration of the vehicle 71. As such, the detection and ranging sensor 54 may be a radar sensor 54. The detection and ranging sensor 54 may also be configured to output a light, such as infrared laser light, receive the reflected light, and measure a time from outputting the light to receiving the reflected light. By measuring a time to receive the reflected light, the detection and ranging sensor 54 can use the time measurement as the basis for detecting a vehicle 71 and measuring the speed and acceleration of the vehicle 71. As such, the detection and ranging sensor 54 may be a light detection and ranging (lidar) sensor. The sensor array 50 may include one or more lidar and radar sensors 54 or a combination of lidar and radar sensors 54. The speeds and accelerations detected by the detection and ranging sensor 54 may be used by the GPU 22 using AI algorithms to predict the driving behaviors of the vehicles 71 around the intersection 200.

The sensor array 50, or individual cameras 52 and detection and ranging sensors 54, may be statically mounted at intersections to acquire a 360° view around the intersection. For example, at a four-way intersection, a sensor array 50 or individual cameras 52 and/or detection and ranging sensors 54 may be installed to acquire data for each of the four junction roads approaching the intersection (i.e., each junction road having a dedicated sensor array 50). In this example, each sensor array 50 (or camera 52 and detection and ranging sensor 54) may be configured to have a 90 degrees)(° or greater field of view for each of the junction roads approaching the intersection. Additional sensors arrays 50 or individual cameras 52 and/or detection and ranging sensors 54 may be installed to provide a 360° view within the intersection itself.

With reference again to FIG. 2, while a four-way intersection 200 is shown, the driving behavior prediction and interpretation system 1 may also be used at more complex intersections with a greater number of junction roads, at roundabouts, and at intersections with less junction roads (e.g., three-way intersections).

The RSU 20 can determine the status of the traffic control signals 202 and the pedestrian control signals 204 through a wired or wireless connection. That is, the RSU 20 is configured to receive SPaT messages from the traffic control signals 202 and 204 to determine the status of the traffic control signals 202 and 204. Alternatively, the RSU 20 may determine the status of the traffic control signals 202 and 204 by the cameras 52.

The image and motion data acquired by the sensor arrays 50 is used by the RSU 20 with AI algorithms to predict the driving behaviors of the vehicles 71 around the intersection 200. That is, the sensor arrays 50 collect data to detect, localize, and track the vehicles 71 in and around the intersection 200. The RSU 20 may use image processing and machine vision to identify and track the vehicles 71. The RSU 20 can then use the detection and ranging sensors 54 to acquire measurements for determining the spatial-temporal data of the vehicles 71 such as trajectory, path, direction, speed, and acceleration.

The data acquired by the sensor arrays 50 can be used by the RSU 20 to compute proxy BSMs from the vehicles 71. That is, the RSU 20 can compute proxy spatial-temporal data for the vehicles 71 in lieu of, or in addition to, sensors on the vehicle side gathering spatial-temporal data to compute a BSM for the vehicle 71. The RSU 20 can then use the proxy spatial-temporal data (i.e., proxy BSMs) alone or with BSMs from the vehicle with AI algorithms to predict the driving behaviors of the vehicles 71.

The proxy BSMs calculated by the RSU 20 may include a subject vehicle's speed and acceleration in addition to the subject vehicle's distance to the stop line 206, the distance from the subject vehicle to a lead vehicle (i.e., a vehicle traveling in front of the subject vehicle), the velocity and acceleration of the lead vehicle, the heading or steering wheel angle of the subject vehicle, and the status of the traffic control signals 202. The proxy BSMs for the vehicles 71 can be processed by the GPU 22 with AI algorithms to predict the driving behaviors of the vehicles 71.

With reference again to FIG. 1, on the vehicle side, the vehicles 71 may include the OBU 70 in addition to other sensors and systems such as a camera 80, a navigation ECU 81 (i.e., vehicle navigation system), a throttle sensor 83, a speed sensor 84, a brake sensor 85, and a steering wheel angle sensor 86.

The driving behavior prediction and interpretation system 1 may include vehicles that are enabled for DSRC as to communicate with V2X systems. For example, a vehicle 71 enabled for DSRC may use communication module 30 to communicate with the communication module 30 of the RSU 20. DSRC-enabled vehicles 71 may transmit BSMs to the RSU 20 for processing with the proxy BSMs calculated by the RSU 20 to predict the driving behaviors of the vehicles 71. Similarly, DSRC-enabled vehicles 71 may receive the proxy BSMs from the RSU 20 via the communication module 30.

However, the driving behavior prediction and interpretation system 1 is not limited to DSRC-enabled vehicles 71. For vehicles lacking OBUs 70, the RSU 20 may calculate proxy BSMs for the vehicles lacking OBUs 70. The proxy BSMs alone can be used by the driving behavior prediction and interpretation system 1 to predict and interpret the driving behavior of vehicles without an OBU 70.

For DSRC-enabled vehicles 71, the vehicles 71 may transmit CAN data from vehicle sensors such as the throttle sensor 83, speed sensor 84, brake sensor 85, and steering wheel angle sensor 86 to respectively transmit the throttle opening rate, velocity, brake pressure, and steering wheel angle of the vehicle in a BSM to the RSU 20 via the communication module 30. The CAN data from DSRC-enabled vehicles 71 can be used in addition to the proxy BSMs calculated by the RSU 20 to predict the driving behaviors of the DSRC-enabled vehicles 71. That is, DSRC-enabled vehicles 71 may transmit BSMs to the RSU 20 for the RSU 20 to use as the basis for predicting and interpreting the driving behavior of the DSRC-enabled vehicle 71. The CAN data (i.e., vehicle sensor data) acquired from the sensors 83, 84, 85, and 86 can also be used to interpret the driving behavior of the vehicle 71.

While the components of the OBU 70 function the same as the components of the RSU 20, certain example embodiments of the OBU 70 may not include all the components of the RSU 20. For example, in one example embodiment, the OBU 70 may not include the GPU 22. The GPU 22 may be an optional component of the OBU 70. In such an example embodiment, the driving behavior predictions and interpretations may be calculated solely by RSU 20. In an alternative embodiment for vehicles 71 without a GPU 22 in the OBU 70, these vehicles may use a distributed communication network, for example, via vehicle-to-vehicle (V2V) communications so that each vehicle 71 in the V2V network shares the computational load for the driving predictions to put less of a computational burden on each vehicle in the V2V network. In this way, each vehicle 71 in the V2V network may use the CPU 24 in the OBU 70 and the distributed cloud networking system 40 for processing data and calculating driving predictions without using the enhanced processing power of the GPU 22.

However, DSRC-enabled vehicles 71 may include a GPU 22 in the OBU 70. In such cases, the GPU 22 in the OBU 70 may calculate driving behavior predictions and be used to interpret the driving behavior of the vehicle 71. For example, the RSU 20 may send the proxy BSM associated with the vehicle 71 to the vehicle 71 for the OBU 70 in the vehicle 71 to predict and interpret the driving behavior of the vehicle 71. In other example embodiments, the driving behavior predictions and interpretations for vehicles having GPUs 22 in the OBU 70 may be calculated by the RSU 20.

The camera 80 may be used to capture image data for information that cannot be ascertained by a proxy BSM. For example, the camera 80 may be a forward-facing camera and be used to capture data related to a pedestrian passing in front of the vehicle 71, traffic signs in front of the vehicle, bicyclists in front of the vehicle, and the like. The information from the image data captured by the camera 80 may be either processed by the OBU 70 or transmitted to the RSU 20 for further processing. That is, such information may be used by either the RSU 20 and/or the OBU 70 with other data for predicting and interpreting the driving behavior of the vehicle.

The navigation ECU 81 may include map data 82 for a map API and be configured to operate as the navigation system for the vehicle 71. For example, the navigation ECU 81 can display a navigation map on a display in the vehicle (not shown). Trajectory data from the navigation map may be used as the basis for driving behavior prediction. For example, upcoming turn information may be used to predict the driving behavior of a vehicle. The trajectory data from the map API can be used to determine the current location of the vehicle 71, predict the location of the vehicle 71 in the next five meters, the next ten meters, the next fifteen meters, the next twenty meters, and the like. In lieu of distance-based future predictions, time-based future predictions may also be used. For example, the trajectory data from the map API can be used to predict the location of the vehicle 71 in the five seconds, ten seconds, and the like.

For vehicles equipped with an OBU 70, the proxy BSM calculated by the RSU 20 may be transmitted to the OBU 70 for onboard behavior interpretation and prediction calculations. For vehicles without an OBU 70, only image data from the camera 80 and trajectory data from the navigation ECU 81 is available for onboard driving behavior interpretation and prediction calculations.

The data processing from both the RSU 20 and the OBU 70 allows for both driving behavior prediction and interpretation, with longer prediction times than conventional driving behavior predictions systems (e.g., accurate driving predictions more than two seconds into the future). The driving behavior prediction and interpretation system 1 allows for driving predictions for regular vehicles without any on-board computational and connection capabilities (e.g., vehicles without an OBU 70).

The driving behavior prediction and interpretation system 1 uses an unsupervised learning method to cluster data acquired by the vehicle sensors (i.e., BSM) and data acquired by the sensor array 50 (i.e., proxy BSM) into segments. The segments can then be used as the basis for symbolic representation and natural language interpretation to interpret the driving behavior.

The driving behavior prediction and interpretation system 1 then uses deep learning with previous symbolic representations to predict the next symbolic representations for the next segments. Since segments usually last for several seconds (e.g., ten seconds), the prediction results of the driving behavior prediction and interpretation system 1 are for the next several seconds (e.g., ten seconds into the future).

Since the driving behavior prediction and interpretation system 1 uses unsupervised learning, unlimited data can be generated to use for prediction training. As such, the deep learning used by the driving behavior prediction and interpretation system 1 is less prone to overfitting and other random errors and noise, which improves the prediction accuracy of the driving behavior prediction and interpretation system 1.

Figure 3:
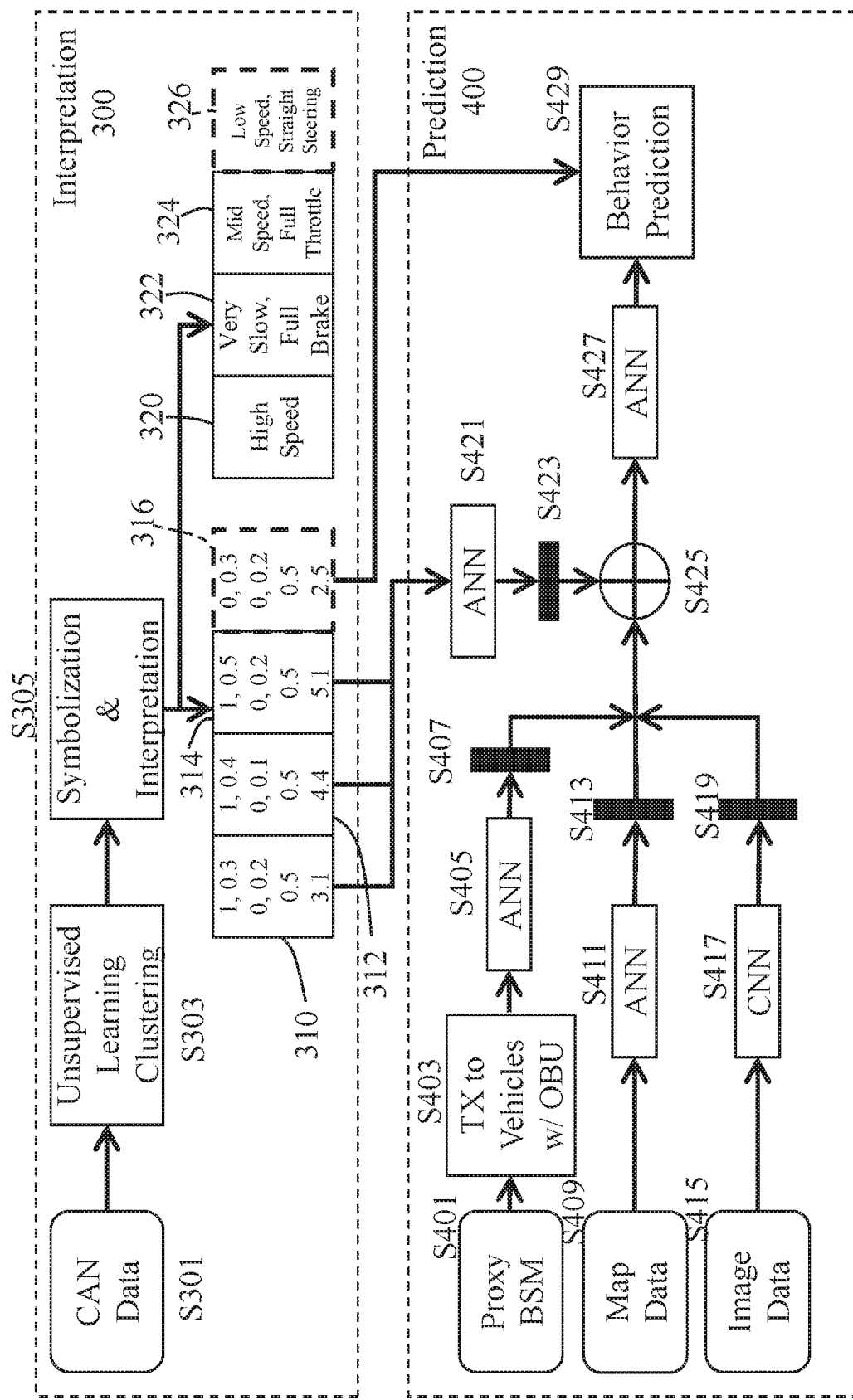
FIG. 3 is a process flow for predicting and interpreting driving behavior.

With reference to FIG. 3, a schematic diagram illustrating a process flow of the driving behavior prediction and interpretation system 1 for vehicle side computation is shown. In FIG. 3, the process flow may be divided into an interpretation process 300 and a prediction process 400.

In the driving behavior interpretation process 300, at S301, the sensor data (i.e., CAN data) is first acquired from the sensors 83, 84, 85, and 86. That is, at S301, the OBU 70 acquires the sensor data from the sensors 83, 84, 85, and 86 on the vehicle 71 and processes the sensor data onboard the vehicle 71 using the OBU 70.

At S303, the OBU 70 uses unsupervised learning clustering methods to cluster and segment the sensor data (i.e. the CAN data or the vehicle data). Specifically, the GPU 22 of the OBU 70 may use one of the following unsupervised learning clustering methods for clustering and segmenting the vehicle data: (i) a hidden Markov model (HMM), (ii) a hidden semi-Markov model (HSMM), (iii) a beta process autoregressive hidden Markov model (BP-AR-HMM), (iv) a hierarchical Dirichlet process hidden Markov model (HDP-HMM), (v) a sticky hierarchical Dirichlet process hidden Markov model (sHDP-HMM), and (vi) a sticky hierarchical Dirichlet process hidden semi-Markov model (sHDP-HSMM). While example hidden Markov models are described as examples of unsupervised learning clustering methods, the unsupervised learning clustering methods are not limited to the example hidden Markov models, and other deep learning methods and AI algorithms may be used for clustering and segmenting the sensor data. The hidden Markov models used for clustering and segmenting the sensor data can be integrated with one of the following language models—that is, the GPU 22 of the OBU 70 can integrate one of the following, non-limiting, example language models with the hidden Markov models: (i) a double articulation analyzer (DAA), (ii) a nonparametric Bayesian double articulation analyzer (NBP-DAA), (iii) a DAA followed by latent Dirichlet allocation (LDA), (iv) a like language model, or (v) another language model.

After integrating a language model with the hidden Markkov model, the OBU 70 outputs the unsupervised learning clustering as segmented driving data (i.e., sensor data) at S305.

In FIG. 3, example symbolic representations are given by outputs 310, 312, and 314, while outputs 320, 322, and 324, show example natural language explanations. The symbolic representations 310, 312, and 314, are merely examples and do not correspond to the example natural language explanations in 320, 322, and 324

A ground truth 316 and corresponding natural language explanation 326 is bounded by a dashed line. The ground truth 316 is described in greater detail below.

Figure 4:
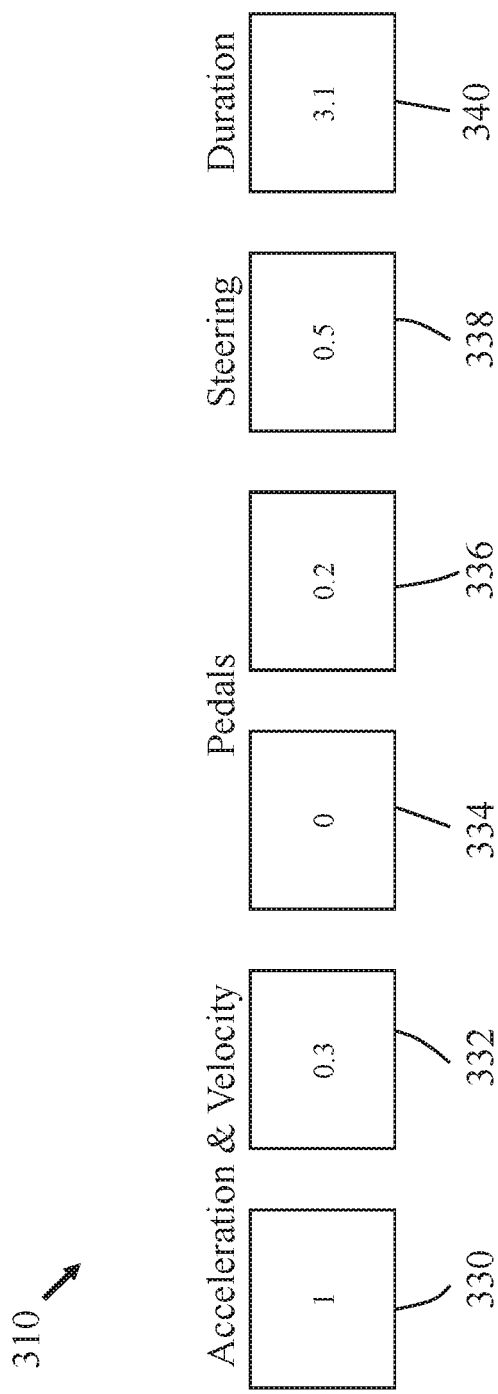
FIG. 4 illustrates a symbolic representation of a segment.

The symbolic representations given by output 310 are described with reference to FIG. 4. In FIG. 4, the symbolization of the segmented vehicle data is shown by six digits 330, 332, 334, 336, 338, and 340.

The first two digits 330 and 332 indicate the vehicle's acceleration and velocity, respectively. The first digit 330 can have an integer value of 0, 1, or 2. When the first digit 330 is 0 (zero), this is interpreted as the vehicle 71 having a constant speed—that is, zero acceleration. When the first digit 330 is 1 (one), this is interpreted as the vehicle 71 slowing down. When the first digit 330 is 2 (two), this is interpreted as the vehicle 71 speeding up.

The second digit 332 is a float value between zero and one (i.e., 0-1) and is related to the velocity of the vehicle 71. A value of the second digit 332 close to 1 (one) means that the vehicle 71 is traveling at high speed.

The third and fourth digits 334 and 336 represent the pedal position for the throttle and brake pedals, respectively, in the vehicle. The third digit 334 is a float value between zero and one (i.e., 0-1) and is related to pressure on the throttle pedal (i.e., accelerator pedal). The third digit 334 being close to 1 (one) means full throttle (i.e., the accelerator pedal is completely depressed). The fourth digit 336 is a float value between zero and one (i.e., 0-1) and is related to pressure on the brake pedal. The fourth digit 336 being close to 1 (one) means full braking (i.e., the brake pedal is completely depressed).

The fifth digit 338 is a float value between negative one and one (−1-1) and represents the steering wheel angle of the vehicle 71. Values between −1 and 0 indicate a left turn while values between 0 and 1 indicate a right turn—that is, $-1 \leq x < 0$, where x is a float value, indicates a left turn, and $0 < x \leq 1$, where x is a float value indicates a right turn. An absolute value near 1 (one) indicates a full turn by the vehicle 71 (i.e., the steering wheel of the vehicle 71 is completely turned).

The sixth digit 340 is a float value greater than 0 (zero) and indicates a duration of time in seconds of the current segmentation.

The above-described values for the digits 330, 332, 334, 336, 338, and 340 can be the mean of time-series data segmentation.

The driving behavior interpretation of the symbolization of the vehicle data segmentation shown in FIG. 4 can be interpreted as the vehicle 71 slowing down (i.e., decelerating) with a low speed, slight depression of the brake, and turning right. This driving behavior lasts for 3.1 seconds.

With reference again to FIG. 3, the driving behavior prediction process 400 is described. At S401, the RSU 20 calculates the proxy BSM for the vehicle 71 using data acquired by the sensor array 50.

Assuming the vehicle 71 is a DSRC-enabled vehicle, at S403, the communication module 30 of the RSU 20 transmits the proxy BSM data to the OBU 70 of the vehicle 71. The proxy BSM data is received by the communication module 30 of the OBU 70. The proxy BSM data from the RSU 20 includes (i) distances from the vehicle 71 to the stop line 206, (ii) distance from the vehicle 71 to a lead vehicle traveling in front of the vehicle 71 in the same direction, (iii) the velocity of the lead vehicle in front of the vehicle 71, (iv) the acceleration of the lead vehicle in front of the vehicle 71, and (v) traffic light status (i.e., from SPaT data). For intersections without any traffic control signals 202, the traffic light status may be omitted from the proxy BSM.

At S405, the OBU 70 normalizes the proxy BSM data and then applies the normalized proxy BSM data to one of a plurality of layers in an artificial neural network (ANN). If, for example, the ANN used by the OBU 70 at S405 is a two-layer ANN with a hidden layer of sixty-four neurons and an output layer of sixty-four neurons, the total number of training parameters (assuming the five inputs from the proxy BSM data) is 20,480 parameters, as given by Equation 1

$$5 \times 64 \times 64 = 20,480 \qquad \text{(Equation 1)}$$

At S407, the ANN at S405 outputs a multi-dimensional feature vector of the proxy BSM surroundings. In other words, the OBU 70 outputs a surrounding feature vector at S407. The surrounding feature vector may also be referred to as a spatial-temporal data vector, because the proxy BSM is based on the spatial-temporal data of the vehicle acquired by the camera 52 and the detection and ranging sensor 54. For vehicles without a communication module 30 as part of the OBU 70 for DSRC, the proxy BSM data will not be an input for predicting the driving behavior of the vehicle 71.

At S409, the OBU 70 acquires the map API data from the navigation ECU 81. That is, the OBU 70 uses the future trajectory data from the navigation map API as another input for predicting driving behavior. As described above, the map API data may include the current location of the vehicle 71, the location of the vehicle 71 in the next 5 meters, 10 meters, 15 meters, 20 meters, and the like. This map API data is converted to a vector. The vector may also indicate if the vehicle 71 is turning or going straight.

At S411, the vector with the map API data is normalized and applied to one of a plurality of layers of a fully connected ANN. Similar to the ANN used at S405 to process the proxy BSM data, the ANN at S411 has tens of thousands of parameters.

After the ANN processing at S411, at S413, a multi-dimensional map feature vector is output. For vehicles that do not have a navigation ECU 81 (i.e., vehicles without a navigation system or map API), the driving behavior prediction will not include map API data.

At S415, the OBU 70 acquires image data from the vehicle camera 80 as input data for predicting the driving behaviors of the vehicle 71. For vehicle OBUs 70 lacking a communication module 30 (i.e., vehicles not enabled for DSRC), image data from the camera 80 may be used as the main information for detecting objects around the vehicle 71. For vehicles with a communication module 30 (i.e., DSRC-enabled vehicles) the image data from the camera 80 may be used to complement the proxy BSM data from the RSU 20. For example, the image data from the camera 80 may include information related to pedestrians around the vehicle 71, the number of lanes on a road, traffic signs, and other information not included in the proxy BSM.

At S417 a convolutional neural network (CNN) is used to process the image data. The CNN used at S417 may include less training parameters than conventional CNNs used for image processing. For the CNN used at S417, the original image data from the camera 80 may first go through an instance segmentations deep neural network that is trained with fixed parameters—that is, a large, non-trainable CNN. The large non-trainable deep neural network outputs an instance segmented image of the image data in block colors, and this instance segmented image is then sent to a smaller CNN network with trainable parameters. In this way, the CNN used to output the image feature vector at S419 keeps the total number of parameters small. Since the trained instance segmentation already extracts useful information, the system 1 is less prone to overfitting, random errors, and noise.

The symbolic representation outputs 310, 312 and 314 used to generate natural language interpretations of the driving behavior 320, 322, and 324, are used as inputs at S421. The symbolic representation outputs 310, 312, and 314 represent interpretations of previous driving behaviors, while the ground truth at 316 is the driving behavior to predict. That is, the driving behavior outputs 310, 312, and 314 are input as data for the ANN at S421. The ANN at S421 can be any one of (i) a fully connected neural network, (ii) a recurrent neural network for processing time-series data, and (iii) a one-dimensional convolution neural network (1-D CNN) for processing time-series data. If the ANN at S421 uses the fully connected neural network or 1-D CNN, the number of previous segmentations (e.g., driving behavior outputs 310, 312, and 314) are fixed. If the ANN at S421 uses the recurrent neural network, the number of previous segmentations is flexible. When, for example, new driving behavior is predicted after the output of the ground truth 316, the ground truth 316 becomes previous driving behavior that is used to predict the new driving behavior.

At S423, the ANN at S421 outputs a behavior feature vector for use in the driving behavior prediction neural process.

At S425, the future vectors from the proxy BSM (i.e., the surrounding feature vector at S407), the map trajectory (i.e., the map feature vector at S413), and the image (i.e., the image feature vector at S419), as well at the previous symbolic representation vector (i.e., the behavior feature vector at S423) are concatenated into a single vector (i.e., a concatenated vector). By the end of each segmentation, the network will predict the symbolic representation of the next segmentation. The proxy BSM, image, and map trajectory is the last frame at the end of each segmentation. The concatenated vector at S425 is then output for additional processing through an ANN.

The concatenated vector is processed with an ANN at S427 and the ANN at S427 outputs a driving behavior prediction at S429. The ground truth/labeled data at 316 is a symbolic future representation of the next segmentation. The ground truth 316 matches the driving behavior prediction at S429. The driving behavior prediction may be output in natural language, for example, as the natural language explanation 326.

Returning again to the symbolic representation of the output 310 shown in FIG. 4, the training has both regression and classification problems. For example, the first digit 330 is a classification problem, while the remaining digits 332, 334, 336, 338, and 340 are regression problems. The first digit 330 is a classification problem, because the first digit 330 uses a value 0, 1, or 2—that is, a non-continuous value. As such, because the first digit 330 is not a continuous value, this is a classification problem in the machine learning field. The remaining digits 332, 334, 336, 338, and 340 are regression problems, because these digits use continuous values. For example, the digit 338 representing the steering wheel angle may use any value between −1 and 1. In the machine learning field, the use of continuous values is a regression problem.

With reference again to FIG. 3, since the driving behavior interpreted and predicted in the interpretation process 300 and prediction process 400 is determined using an unsupervised learning method, the training data is theoretically unlimited. Such unlimited training data ensures the ANNs S405, S411, S417, S421, and S427 used in the prediction process 400 are less prone to overfitting, random errors, and noise. The driving behavior prediction at S429 includes both the duration of the segmentation and the predicted driving behavior of the vehicle 71.

Figure 5:
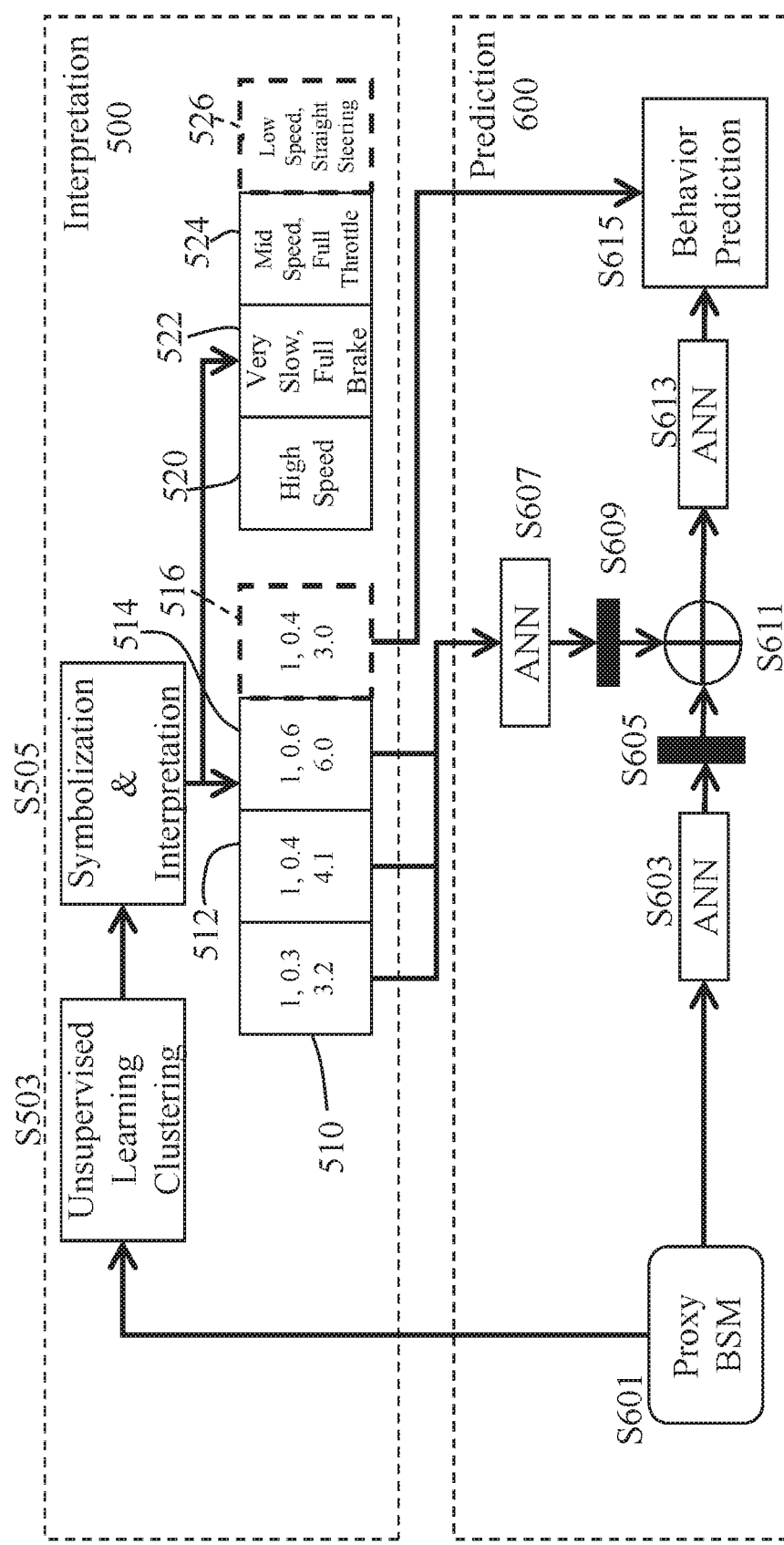
FIG. 5 is another process flow for predicting and interpreting driving behavior.

With reference to FIG. 5, a process flow for the driving behavior interpretation process 500 and the driving behavior prediction process 600 as determined by the infrastructure side (i.e., by the RSU 20) is shown. The driving behavior interpretation and prediction processes 500 and 600 by the RSU 20 are similar to those by the OBU 70 on the vehicle side in FIG. 3, but the process flow in FIG. 5 includes less inputs than what is shown in FIG. 3. That is, for the infrastructure side computation, any data acquired from the subject vehicle 71 itself is not used for the driving behavior interpretation and prediction.

As shown in FIG. 5, the input is the proxy BSM for the subject vehicle calculated by the RSU 20 using the data from the sensor array 50. The proxy BSM data calculated by the RSU 20 at S601 includes additional spatial-temporal data for the subject vehicle as determined by the sensor array 50 such as (i) the speed of the subject vehicle 71 and (ii) the acceleration of the subject vehicle 71. The speed and acceleration of the subject vehicle 71 may also be referred to as the vehicle data. The proxy BSM data calculated by the RSU 20 at S601 additionally includes (iii) distances from the subject vehicle 71 to the stop line 206, (iv) distance from the subject vehicle 71 to a lead vehicle traveling in front of the subject vehicle 71 in the same direction, (v) the velocity of the lead vehicle in front of the subject vehicle 71, (vi) the acceleration of the lead vehicle in front of the subject vehicle 71, and (vii) the traffic light status (i.e., from SPaT data). This other data in the proxy BSM may also be referred to as surrounding data. For intersections without any traffic control signals 202, the traffic light status may be omitted from the proxy BSM.

At S503, the vehicle data for the subject vehicle 71 including the speed of the subject vehicle 71 and the acceleration of the subject vehicle 71 are used as the inputs at S503. The algorithms used for the unsupervised learning clustering at S503 are the same as those used at S303 in FIG. 3. For example, the RSU 20 may use the hidden Markov models described above with reference to FIG. 3 to cluster and segment the vehicle data. Likewise, the RSU 20 may integrate a language model like those described above with reference to FIG. 3 with the hidden Markov model. The algorithms at S503 use different inputs and hyper-parameters for the unsupervised learning clustering than those used at S303 in FIG. 3.

At S505, after integrating a language model with the hidden Markov model, RSU 20 outputs the unsupervised learning clustering as segmented driving data.

In FIG. 5, example symbolic representations are given by outputs 510, 512, and 514, while outputs 520, 522, and 524, show example natural language explanations. The symbolic representations 510, 512, and 514 are merely examples and do not correspond to the example natural language explanations in 520, 522, and 524.

Figure 6:
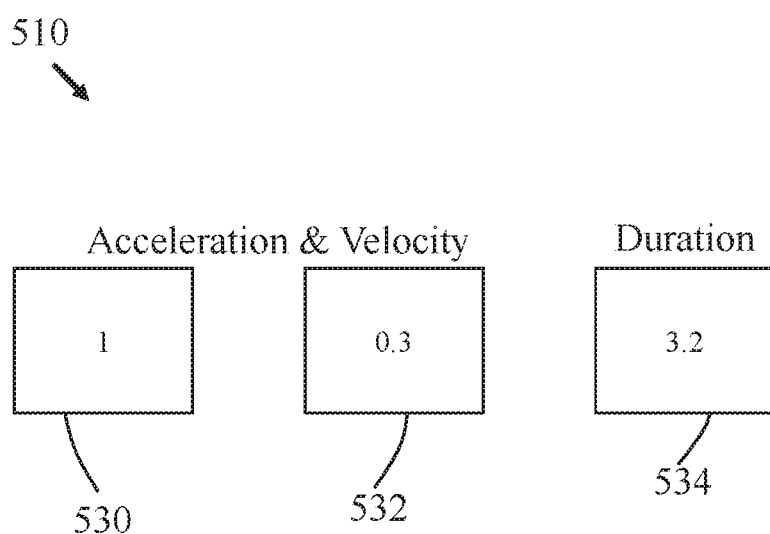
FIG. 6 illustrates another symbolic representation of a segment.

With reference now to FIG. 6, the symbolic representations given by output 510 are described. In FIG. 6, the symbolization of the segmented vehicle data is shown by three digits 530, 532, and 534.

The first two digits 530 and 532 indicate the vehicle's acceleration and velocity. The first digit 530 can have an integer value of 0, 1, or 2. When the first digit 530 is 0 (zero), this is interpreted as the vehicle 71 having a constant speed—that is, zero acceleration. When the first digit 530 is 1 (one), this is interpreted as the vehicle 71 slowing down. When the first digit 330 is 2 (two), this is interpreted as the vehicle 71 speeding up.

The second digit 532 is a float value between zero and one (i.e., 0-1) and is related to the velocity of the vehicle 71. A value of the second digit 532 close to 1 (one) means that the vehicle 71 is traveling at high speed.

The third digit 534 is a float value greater than 0 (zero) and indicates a duration of time in seconds of the current segmentation.

In FIGS. 5 and 6, the symbolization and interpretation by the infrastructure side computation is different than the symbolization and interpretation by the vehicle side computation. In FIGS. 5 and 6, the symbolization and interpretation only have vehicle acceleration, vehicle speed, and segmentation duration. The driving behavior interpretation of the symbolization of the vehicle data segmentation shown in FIG. 6 can be interpreted as the vehicle 71 slowing down (i.e., decelerating) with a low speed. This driving behavior lasts for 3.2 seconds.

With reference again to FIG. 5, at S601, the RSU 20 calculates the proxy BSM for the vehicle 71 using data acquired by the sensor array 50.

At S603, the RSU 20 normalizes the surrounding data in the proxy BSM data and then applies the normalized surrounding proxy BSM data to one of a plurality of layers in an artificial neural network (ANN). For example, if the ANN used by the RSU 20 at S603 is a two-layer ANN with a hidden layer of sixty-four neurons and an output layer of sixty-four neurons, the total number of training parameters (assuming the five inputs from the proxy BSM data) is 20,480 parameters, for example, as given above by Equation 1.

At S605, the ANN outputs a multi-dimensional surrounding feature vector of the surrounding proxy BSM data. In other words, the RSU 20 outputs a surrounding feature vector at S605. The surrounding feature vector may also be referred to as a spatial-temporal data vector, because the proxy BSM is based on the spatial-temporal data acquired by the camera 52 and the detection and ranging sensor 54.

The symbolic representation outputs 510, 512 and 514 used to generate natural language interpretations of the driving behavior 520, 522, and 524, are used as inputs at S607. The symbolic representation outputs 510, 512, and 514 represent interpretations of previous driving behaviors, while the ground truth at 516 is the driving behavior to predict. That is, the driving behavior outputs 510, 512, and 514 are input as data for the ANN at S607. The ANN at S607 can be any one of (i) a fully connected neural network, (ii) a recurrent neural network for processing time-series data, and (iii) a 1-D CNN for processing time-series data. If the ANN at S607 uses the fully connected neural network or 1-D CNN, the number of previous segmentations (e.g., driving behavior outputs 510, 512, and 514) are fixed. If the ANN at S607 uses the recurrent neural network, the number of previous segmentations is flexible. When, for example, new driving behavior is predicted after the output of the ground truth 516, the ground truth 516 becomes previous driving behavior that is used to predict the new driving behavior.

At S609, the ANN at S607 outputs a behavior feature vector for use in the driving behavior prediction neural process.

At S611, the future vectors from the proxy BSM (i.e., the surrounding feature vector at S605) as well at the previous symbolic representation vector (i.e., the behavior feature vector at S609) are concatenated into a single vector (i.e., a concatenated vector). By the end of each segmentation, the network will predict the symbolic representation of the next segmentation. The proxy BSM is the last frame at the end of each segmentation. The concatenated vector at S611 is then output for additional processing through an ANN.

The concatenated vector is processed with an ANN at S613 and the ANN at S613 outputs a driving behavior prediction at S615. The ground truth/labeled data at 516 is a symbolic future representation of the next segmentation. The ground truth 516 matches the driving behavior prediction at S615. A natural language explanation of the driving behavior prediction may be output, for example, as the natural language explanation 526.

Since the driving behavior interpreted and predicted in the interpretation process 500 and prediction process 600 is determined using an unsupervised learning method, the training data is theoretically unlimited. Such unlimited training data ensures the ANNs S603, S607, and S613 used in the prediction process 600 are less prone to overfitting, random errors, and noise. The driving behavior prediction at S615 includes both the duration of the segmentation and the predicted driving behavior of the vehicle 71. With the infrastructure side computation, while the computation may be similar to the computations in the process flow of FIG. 3, with less input information, the accuracy of the driving behavior prediction with the infrastructure side computation may be lower than the vehicle side computation.

In the example embodiments described herein, the driving behavior prediction and interpretation system 1 can use computational capabilities on both the vehicle side and infrastructure side to make driving behavior predictions and interpret driving behavior. As such, the driving behavior prediction and interpretation system 1 can be used with DSRC-enabled vehicles that can connect and communicate with the system 1, and also be used with vehicles lacking such computational and communication capabilities.

By using unsupervised learning methods to cluster the driving data from various inputs into segmentations, a symbolic representation of the driving behavior can be generated and natural language interpretation for the symbolic representation can then be made to output the driving behavior in natural language. For example, insurance personnel may use the driving behavior prediction and interpretation system 1 on vehicles to obtain a clear assessment of the vehicle's driving behavior for setting insurance rates. Likewise, the predicted driving behavior result can also be output in natural language for ease of understanding.

Because previous symbolic representation are used, deep learning can be applied to the previous symbolic representation to predict the next symbolic representation of the next segmentation. Since the segmentations usually last for several seconds, the prediction results predict future driving behavior with a duration similar to the segmentations. On average, the driving behavior prediction and interpretation system 1 can predict longer durations into the future than conventional prediction systems.

The unsupervised learning used by the driving behavior prediction and interpretation system 1 can generate unlimited data for prediction training. As a result, the deep learning used by the system 1 is less prone to overfitting, random errors, and noise.

While the example embodiments describe process flows for both infrastructure side and vehicle side computations, the driving behavior prediction and interpretation system 1 may use a combination of computations from both the vehicle side and the infrastructure side. In other words, the driving behavior prediction and interpretation system 1 is not limited to the process flows of either the vehicle side or the infrastructure side, but may use a combination of both.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A and B should be construed to mean a logical (A OR B), using a non-exclusive logical OR. For example, the phrase at least one of A and B should be construed to include any one of: (i) A alone; (ii) B alone; (iii) both A and B together. The phrase at least one of A and at least one of B." The phrase at least one of A and B should also not be construed to mean "A alone, B alone, but not both A and B together." The term "subset" does not necessarily require a proper subset. In other words, a first subset of a first set may be coextensive with, and equal to, the first set. As used herein, the term "and/or" includes any and all combinations of one or more of the associated listed items.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

What is claimed is:

1. A system for predicting and interpreting driving behavior of a vehicle, the system comprising:
   a first edge computing device configured to acquire spatial-temporal data for the vehicle from one or more sensors that are part of traffic infrastructure, the first edge computing device arranged as a stationary component of traffic infrastructure, the first edge computing device having:
   a processor; and
   a non-transitory computer-readable medium including instructions that are executable by the processor of the first edge computing device, the instructions included on the non-transitory computer-readable medium of the first edge computing device comprising:
      executing one or more unsupervised deep learning methods on the spatial-temporal data acquired by the one or more sensors to cluster the spatial-temporal data into segments,
      integrating a language model with the unsupervised deep learning method to output a driving behavior in natural language,
      normalizing the spatial-temporal data of the vehicle,
      processing the normalized spatial-temporal data of the vehicle with a first artificial neural network to output a spatial-temporal data vector,
      processing the clustered spatial-temporal data segments using a second artificial neural network to output a behavior feature vector,
      concatenating the spatial-temporal data vector and the behavior feature vector into a concatenated vector, and
      processing the concatenated vector with a third artificial neural network to output a predicted driving behavior of the vehicle.

2. The system of claim 1, further comprising:
   a second edge computing device configured to acquire vehicle data from one or more sensors on the vehicle, the second edge computing device disposed in the vehicle, and the second edge computing device having
   a processor; and
   a non-transitory computer-readable medium including instructions that are executable by the processor of the second edge computing device, the instructions included on the non-transitory computer-readable medium of the second edge computing device comprising:
acquiring vehicle data from the one or more sensors on the vehicle; and
communicating the vehicle data to the first edge computing device;
wherein the first edge computing device processes the vehicle data, in addition to processing the concatenated vector with the third artificial neural network, to output the predicted driving behavior.

3. The system of claim 2, wherein
the instructions included on the non-transitory computer-readable medium of the second edge computing device further comprise:
acquiring map data from a navigation system in the vehicle,
acquiring image data from a camera on the vehicle,
processing the map data from the navigation system with a fourth artificial neural network to output a map feature vector,
processing the image data from the camera with a convolutional neural network to output an image feature vector, and
communicating the map feature vector and the image feature vector to the first edge computing device;
wherein the first edge computing device processes the map feature vector and the image feature vector, in addition to processing the concatenated vector with the third artificial neural network, to output the predicted driving behavior.

4. The system of claim 1, wherein the spatial-temporal data includes: a velocity of the vehicle, an acceleration of the vehicle, a distance from the vehicle to a stop line at an intersection, a distance from the vehicle to a lead vehicle, a velocity of the lead vehicle, an acceleration of the lead vehicle, and a status of a traffic signal.

5. The system of claim 1, wherein the unsupervised deep learning method is a hidden Markov model.

6. The system of claim 1, wherein the language model is one of a double articulation analyzer, a nonparametric Bayesian double articulation analyzer, and a double articulation analyzer followed by latent Dirichlet allocation.

7. The system of claim 1, wherein the driving behavior in natural language includes an acceleration of the vehicle, a speed of the vehicle, and a duration of a segment.

8. The system of claim 1, wherein the second artificial neural network is one of a fully connected neural network, a recurrent neural network for processing time-series data, and a one-dimensional convolution neural network for processing time-series data.

9. A system for predicting and interpreting driving behavior of a vehicle, the system comprising:
an edge computing device configured to acquire vehicle data from one or more sensors on the vehicle, the edge computing device disposed in the vehicle, and the edge computing device having
a processor; and
a non-transitory computer-readable medium including instructions that are executable by the processor, the instructions comprising:
executing one or more unsupervised deep learning methods on the vehicle data to cluster the vehicle data into segments,
integrating a language model with the unsupervised deep learning method to output a driving behavior in natural language,
acquiring spatial-temporal data of the vehicle from one or more external remote sensors,
normalizing the spatial-temporal data of the vehicle,
processing the normalized spatial-temporal data of the vehicle with a first artificial neural network to output a spatial-temporal data vector,
processing the clustered vehicle data segments using a second artificial neural network to output a behavior feature vector,
concatenating the spatial-temporal data vector and the behavior feature vector into a concatenated vector, and
processing the concatenated vector with a third artificial neural network to output a predicted driving behavior of the vehicle.

10. The system of claim 9, wherein the instructions further comprise:
acquiring map data from a navigation system in the vehicle,
acquiring image data from a camera on the vehicle,
processing the map data from the navigation system with a fourth artificial neural network to output a map feature vector,
processing the image data from the camera with a convolutional neural network to output an image feature vector,
processing the map feature vector and the image feature vector, in addition to the third artificial neural network, to output the predicted driving behavior of the vehicle.

11. The system of claim 9, wherein the external remote sensor is at least one of a traffic camera, a radar, and a lidar.

12. The system of claim 9, wherein the spatial-temporal data includes: a distance from the vehicle to a stop line at an intersection, a distance from the vehicle to a lead vehicle, a velocity of the lead vehicle, an acceleration of the lead vehicle, and a status of a traffic signal.

13. The system of claim 9, wherein the unsupervised deep learning method is a hidden Markov model.

14. The system of claim 9, wherein the language model is one of a double articulation analyzer, a nonparametric Bayesian double articulation analyzer, and a double articulation analyzer followed by latent Dirichlet allocation.

15. The system of claim 9, wherein the driving behavior in natural language includes an acceleration of the vehicle, a speed of the vehicle, a pedal position of a brake pedal, a pedal position of an accelerator pedal, a steering wheel angle, and a duration of a segment.

16. The system of claim 9, wherein the second artificial neural network is one of a fully connected neural network, a recurrent neural network for processing time-series data, and a one-dimensional convolution neural network for processing time-series data.

17. The system of claim 9, wherein the vehicle data includes a velocity of the vehicle, a throttle opening rate of a throttle on the vehicle, brake pressure of a brake pedal of the vehicle, and a steering wheel angle of the vehicle.

18. A method for interpreting and predicting driving behavior of a vehicle, the method comprising:
clustering, with an edge computing device, vehicle data using an unsupervised deep learning method into segments;

integrating, with the edge computing device, a natural language model with the unsupervised deep learning method to output explanations of the segments in natural language;

normalizing, with the edge computing device, spatial-temporal data of the vehicle acquired by a remote external sensor;

processing, with the edge computing device, the normalized spatial-temporal data with a first artificial neural network to output a surrounding features vector;

processing, with the edge computing device, the segments with a second artificial neural network to output a behavior feature vector;

concatenating, with the edge computing device, the surrounding features vector and the behavior feature vector into a concatenated vector; and processing, with the edge computing device, the concatenated vector with a third artificial neural network to obtain a prediction of driving behavior.

19. The method of claim 18, further comprising:

processing, with the edge computing device, map data from a vehicle navigation system with a fourth artificial neural network to obtain a map feature vector;

processing, with the edge computing device, image data from a camera on the vehicle with a convolutional neural network to obtain an image feature vector;

processing, with the edge computing device, the map feature vector and the image feature vector, in addition to the concatenated vector, to obtain the prediction of driving behavior.

20. The method of claim 18, further comprising:

outputting, with the edge computing device, an explanation of the prediction of driving behavior in natural language.

* * * * *